Patented Aug. 13, 1935

2,011,281

UNITED STATES PATENT OFFICE 2,011,281

PROCESS FOR THE PREPARATION OF PURE BARIUM ZINCATES AND PURE BARIUM COMPOUNDS FROM THE LATTER

Max Herder, Hamburg, Germany, assignor to Sachtleben Aktiengesellschaft für Bergbau und Chemische Industrie, Cologne-on-the-Rhine, Germany No Drawing. Application October 28, 1932, Serial No. 640,015. In Germany December 7, 1931

8 Claims. (Cl. 23—55)

It is a well known fact that soluble barium zinc compounds, for instance barium zincate $(ZnO_2H)_2.Ba.7H_2O$, are formed by adding a solution of zinc sulphate in 10% $NH_3$ to a solution of crystallized barium hydroxide in hot water, keeping the mixture warm for 24 hours, filtrating it from the precipitated $BaSO_4$ and causing the concentrated filtrate to crystallize, by means of cooling down. The result will be a crystallization of $Ba(OH)_2$, $Zn(OH)_2$ and barium zincate, which can be separated mechanically. However, such a method is of no use for technical purposes.

It has further been suggested as for example in Wright's process (U. S. Pat. No. 1,238,242) to convert barium-sulphide with equivalent quantities of the oxides or hydroxides of heavy metals, as for instance ZnO, CuO, etc., into $Ba(OH)_2$, but all these processes have been of no technical use which is partly due to the fact that the reaction goes on rather slowly, and partly, because, owing to the long period of reaction, considerable losses of barium result from the formation of by-products, as for instance bariumthiosulphate, bariumsulphate, etc.

It has been found that the conversion of BaS with $Zn(OH)_2$ and ZnO respectively takes place much more rapidly and without substantial losses of barium, and that soluble barium-zinc compounds are formed when allowing the $Zn(OH)_2$ and ZnO respectively to act in excess upon the BaS. According to the quantity of $Zn(OH)_2$, and ZnO respectively, barium-zinc compounds of different composition will be formed, as for instance $Ba_2O_3Zn$, $Ba_2O_4Zn_2$, or mixtures of same. These substances are soluble and crystallize from their concentrated solutions as pure salts, which contain neither sulphur nor a foreign metal. There will be no formation of thiosulphates or sulphates. The solutions as well as the salts may be used for the preparation of pure $Ba(OH)_2$ and other pure barium salts respectively, in which case valuable by-products as for instance pure ZnS and $Zn(OH)_2$ respectively can be obtained. The following formulas give an idea of the various possibilities:

(1) $2BaS + 3ZnO = 2ZnS + Ba_2O_3Zn$
(2) $2BaS + 4ZnO = 2ZnS + Ba_2O_4Zn_2$
(3) $Ba_2O_3Zn + BaS + 3H_2O = 3Ba(OH)_2 + ZnS$
(4) $Ba_2O_4Zn_2 + 2BaS + 4H_2O =$
$\qquad 4Ba(OH)_2 + 2ZnS$
(5) $Ba_2O_3Zn + 4HCl = 2BaCl_2 + Zn(OH)_2 + H_2O$
(6) $Ba_2O_4Zn_2 + 4HCl = 2BaCl_2 + 2Zn(OH)_2$ The present invention makes it possible to obtain from the cheap barium sulphide, barium compounds of a high degree of purity and of a considerably larger yield than this has been possible up till now according to the already existing processes. If a molecule of barium sulphide is caused to react with a molecule of zinc oxide, the resultant compound is barium zincate, or $BaZnO_2$. However, by causing the reaction mass to contain zinc oxide in excess of said molecular equivalence, I can secure the advantages stated herein. I define this in the claims by stating that the zinc oxide (or zinc hydroxide) is used in excess of equivalence.

For the conversion of the barium zincates, any acids may be used, i. e. mineral acids just as well as organic acids, for instance acetic acid.

It has been proved that it is not necessary to use pure zinc hydroxide or zinc oxide for the reaction. Impure products, as for instance Waelz oxides or other technical zinc oxides, may be made use of. Foreign metals as lead, iron etc. do not pass into the barium-zinc compounds, or into the products obtained from same, as for instance $Ba(OH)_2$, $BaCl_2$, $Zn(OH)_2$, ZnS, etc. Therefore, the process offers a further advantage, i. e. the possibility of refining a relatively useless product, as for instance impure zinc oxide.

In case $Ba(OH)_2$ only is obtained, it is not necessary to isolate the barium-zinc compounds, but same may be kept in solution, and from this solution the zinc will be separated with equivalent quantities of BaS (Formulas 1 and 3 and 2 and 4 respectively). When using impure zinc oxide or zinc hydroxide an impure ZnS will likewise be obtained, which may be converted into the respective zinc salts and $H_2S$ by means of acids. The hydrogen sulphide may be, according to well known processes, worked up to elementary sulphur. From this it appears that not only the barium, but likewise the sulphur of the BaS is utilized.

*Examples*

1. Suspend 500 kg. zinc oxide, for instance so-called Waelz oxide having 72,4% Zn, together with 500 liters of water, heat same to about 80–90° C. and add this mixture to 2700 liters of a barium sulphide lye with 140 gr. Ba per liter, with continuous stirring. As soon as the $H_2S$ reaction will have disappeared, continue stirring for some time. When cooling the solution filtered from the zinc slime, 880 kg. of a white salt will crystallize which, when still being somewhat moist, will have the following composition: 31,79% Ba; 8,26% Zn. The remainder is hydrate- or crystal-water. The salt which is free from impurities, as for instance Fe, S, etc. corresponds to about the formula $Ba_2O_3Zn+aq$. In general, the salt is not crystallized, but the solution is worked up immediately. About 3000 liters of solution will be obtained with 113 gr. Ba and 27 gr. Zn per liter. This barium zincate solution which is clear as water and does not contain any impurities, is mixed with a quantity of purified barium sulphide solution equivalent to the zinc, this solution containing 140 gr. Ba per liter, and this is done under continuous stirring and heating to a temperature of 80 to 90° C., until the zinc reaction will have disappeared. The $H_2S$-reaction of the barium sulphide solution added will disappear immediately after every new addition; but, finally, care must be taken when adding fresh barium sulphide solution, as this addition should be made only to such a degree that the $H_2S$-reaction of the solution may just disappear. In this way, all the zinc will be precipitated as pure white zinc sulphide. After having filtered the same, it may be washed, dried and, for instance worked up to colours. The hot filtrate is crystallized. After sufficient cooling, about 1100 kg. of pure $Ba(OH)_2.8H_2O$ will crystallize out which in somewhat moist state, contains 39,55% Ba. The mother-liquor—about 3500 liters—still contains about 20 gr. Ba per liter and it is used for the preparation of fresh BaS-solution crude barium sulphide, so that no barium losses will result. The barium output is thus 92% of the barium brought in by the barium sulphide solution.

The zinc slime is washed in order to eliminate the last remainders of soluble barium compound or compounds. The washing-water of about 500 liters is used for suspending fresh zinc oxide. The zinc slime containing a high percentage of sulphur, may be decomposed with acid and worked up to zinc salts. From the escaping hydrogen sulphide, sulphur may be obtained by already known methods.

2. Mix up 3000 liters of the barium zincate solution obtained according to Example 1, with a quantity of hydrochloric acid equivalent to the barium. About 642 kg. of hydrochloric acid of 28% are necessary. By this operation, the zinc precipitates as hydroxide or oxide respectively and is separated from the clear barium chloride solution by filtration. The barium chloride solution is evaporated for crystallization purposes and the $BaCl_2.2H_2O$ is obtained as such. The output is about 90%. The filtrated zinc precipitate is then washed, dried and heated and gives an excellent zinc oxide. It may as well be used as very pure starting material for zinc salts.

The barium-zinc-compound, instead of being treated with hydrochloric acid, may be worked up with such a quantity of sulphuric acid that barium sulphate and zinc sulphate are formed.

3. Mix up thoroughly 500 kg. zinc oxide of 72,4% Zn, with 800 kg. crude barium sulphide of about 79% BaS, and expose the mixture, in a suitable furnace, to such temperatures which must be below the melting point of the components, until complete conversion has taken place. The so obtained reaction-product is lixiviated in the usual way with water and, after filtration, gives a solution of barium zincate compounds, from which the barium-zinc compound may be obtained through crystallization. However, as mentioned in Examples 1 and 2, the solution may also be worked up to barium-hydroxide and barium salts respectively. The yields are about the same as mentioned in the two above examples.

I claim:

1. A process for the preparation of pure barium compounds which comprises reacting barium sulphide with a substance selected from the group consisting of zinc oxide and zinc hydroxide, said selected zinc compound being employed in excess of unimolecular equivalence, and then splitting the resulting barium zincate into pure barium compounds and zinc salts.

2. A process for the preparation of pure barium hydroxide which comprises reacting barium sulphide with a substance selected from the group consisting of zinc oxide and zinc hydroxide, said selected zinc compound being employed in excess of unimolecular equivalence, separating the resulting barium zincate from the reaction mixture and then treating it with barium sulphide to split the same into pure barium hydroxide and zinc sulphide.

3. A process for the preparation of pure barium salts which comprises reacting barium sulphide with a substance selected from the group consisting of zinc oxide and zinc hydroxide, said selected zinc compound being employed in excess of unimolecular equivalence, separating the resulting barium zincate from the reaction mixture and then treating it with acid to split the same into a pure barium salt of such acid and zinc compounds.

4. A process for the preparation of pure barium hydroxide which comprises reacting barium sulphide with a substance selected from the group consisting of zinc oxide and zinc hydroxide, said selected zinc compound being employed in excess of unimolecular equivalence, adding to the reaction mixture barium sulphide and then separating the formed barium hydroxide from the zinc sulphide.

5. A process for the preparation of pure barium chloride which comprises reacting barium sulphide with an amount of zinc oxide in excess of unimolecular proportion, adding to the reaction mixture hydrochloric acid, filtering off the precipitated zinc hydroxide and crystallizing the barium chloride.

6. A process for the preparation of pure barium compounds which comprises reacting barium sulphide with an amount of technical zinc oxide in excess of unimolecular proportion, and then splitting the resulting barium zincate into a pure barium compound and a zinc salt.

7. A process for the preparation of pure barium compounds which comprises heating together crude barium sulphide with an amount of zinc oxide in excess of unimolecular proportion, lixiviating the reaction product with water and then recovering from the resulting barium zincate solution a pure barium compound.

8. A process for the preparation of pure barium compounds which comprises suspending zinc oxide in water, heating this suspension to about 80–90° C., adding thereto barium sulphide in quantity such that the zinc oxide is in excess of unimolecular proportion, and then splitting the resulting barium zincate into a pure barium compound and a zinc salt.

MAX HERDER.